Aug. 26, 1924.
M. KAHNE
SAFETY BABY CARRIAGE
Filed Dec. 22, 1923
1,506,347
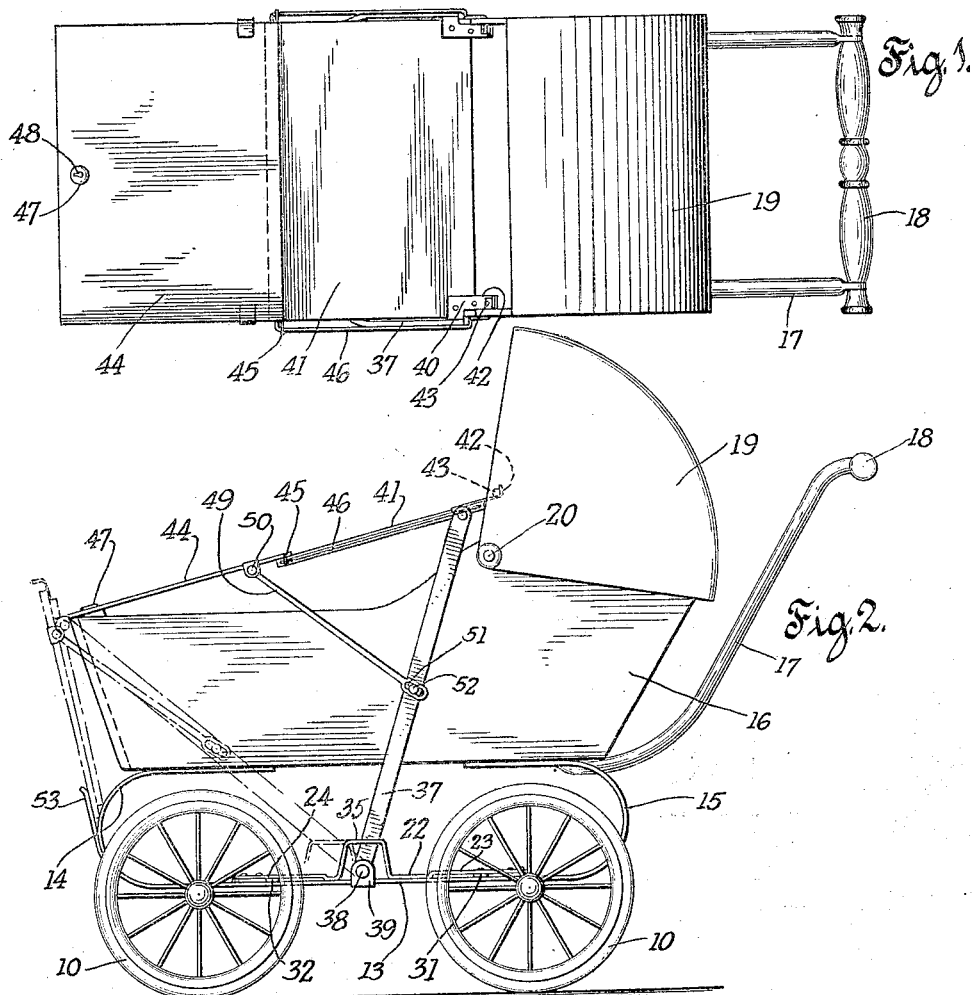
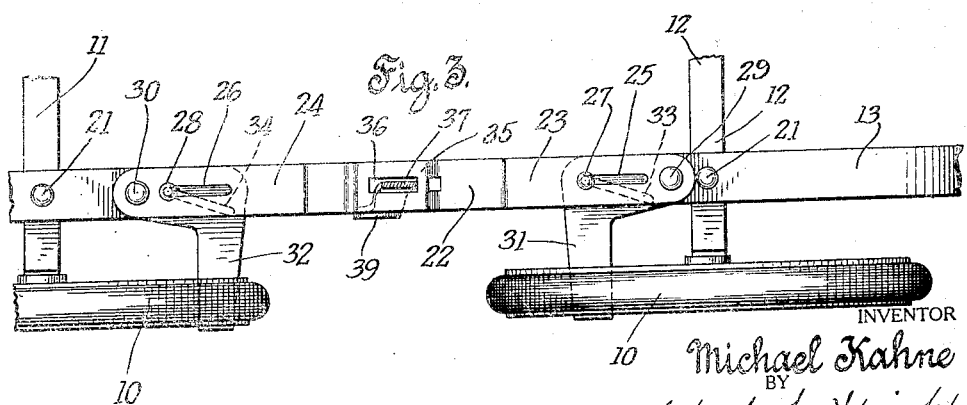
INVENTOR
Michael Kahne
BY
Charles L. Wright
ATTORNEY Patented Aug. 26, 1924.

1,506,347

UNITED STATES PATENT OFFICE.

MICHAEL KAHNE, OF NEW YORK, N. Y.

SAFETY BABY CARRIAGE.

Application filed December 22, 1923. Serial No. 682,343.

*To all whom it may concern:*

Be it known that I, MICHAEL KAHNE, a citizen of the United States, and a resident of the city, county, and State of New York, have invented certain new and useful Improvements in Safety Baby Carriages, of which the following is a specification.

This invention relates to improvements in baby coaches, perambulators and like vehicles suited to carry an infant and propelled by hand.

The principal object of the invention is to provide means whereby the safety of the occupant of the carriage is assured, it being protected from being kidnapped or removed from the vehicle by unauthorized persons, by a cover or shield provided with a lock, forming an effective barrier when in one position but being capable of folding inconspicuously when its use is not required.

A further purpose is to produce a co-related device whereby the wheels of the vehicle are automatically prevented from turning at such times as the protective shield is in its operative position.

Another aim is in the provision of a light, strong and secure device, readily applied and easily operated, without detrimentally affecting the appearance of the vehicle.

These several objects are accomplished by the novel construction, combination and arrangement of parts hereinafter described and shown in the accompanying drawing forming a material part of this disclosure, and in which:—

Figure 1 is a stop plan view of a conventional type of baby carriage, illustrating the application of the invention.

Figure 2 is a side elevational view of the same.

Figure 3 is a fragmentary plan view of the wheel locking device, drawn to an enlarged scale.

Referring more in detail to the drawing, the numeral 10 designates the wheels generally, mounted in pairs upon axles 11 and 12, respectively at the front and rear, said axles being rigidly connected by bars 13 arranged in parallel along their ends adjacent to the wheels.

These bars are bent to form relatively large curves 14 and 15, acting as springs, their inreaching ends having secured to them the bottom of the carriage body, generally designated by the numeral 16, the axle, bar and spring elements constituting a frame.

Also attached to the body are a pair of handle bars 17, extending upward and rearward where they are connected by a cross bar 18 suited to be grasped by the hand.

A hood 19 of the usual type is pivoted at 20 to the raised rear portion of the body, all of the aforesaid parts being of the usual type of construction.

The invention consists in providing a cover which may be extended over the main portion of the open body 16 or folded at the front end as shown by the broken lines in Fig. 2.

The longitudinally extending side bars 13 are fixed by bolts or rivets 21 to the axles 12 and mounted on the bars 13 are slide bars 22 having raised ends 23 and 24 containing elongated slots 25 and 26 through which pass headed rivets 27 and 28 fixed in the bars 13, limiting the slide and guiding them laterally.

Pivoted on rivets 29 and 30, between the raised elements of the slide bars and rigid bars 13 are detents having right angled extensions 31 and 32 adapted, when in an extended position to engage between the spokes of the wheels 10 as shown in Fig. 3.

Upon moving the sliding bars 22 towards the front, the fixed rivets move in the angularly elongated slots 33 and 34, as the pivots 29 move towards the rivets 27 and 28 causing the detents to turn on their pivots and out of the path of the wheels, in a manner thought to be apparent.

Raised elements 35 having flattened tops containing slots 36 are formed centrally of the bars 22 and extending through the slots are the lower ends of levers 37 pivoted on pins 38 set in brackets 39 rigidly fixed to the bars 22.

The upper end of the levers 37 are pivotally engaged to brackets 40 attached to opposite sides of a plate 41, made of wood, wicker work or other firm material, the rearwardly extending ends of the brackets being upturned in the manner of hooks 42 to engage pins 43 rigidly set in the front portion of the pivoted hood 19, shoulders on the brackets abutting its extreme front edge as shown.

Slidably engaged to the front edge of the plate 41 is another plate 44 having fixed in its side edges at the end adjacent the plate 41, eyes 45 in which slide rods 46 having angularly bent ends set in the side edges of the plate 41, at its corners and acting as guides when the plates are respectively moved, as in extending or folding.

At the center of the front of the plate 44 is an opening 47 receptive of a projecting lock 48 fixed to the front portion of the body of the vehicle.

Stay rods 49 are pivoted to clips 50 fixed on the side edge of the plate 44 at one end, these rods having flattened enlargements at their opposite ends containing slots 51 receptive of headed pins 52 fixed in the outer sides of the levers 37.

When not in use the plates are moved into superposed relation, the levers 37 turned forward, so that the lower edges of the plates extend over the front of the vehicle and rest upon clips 53 fixed to the front spring elements 14, as best shown in the dotted lines in Fig. 2.

The operation of extending is readily accomplished by grasping the plates and moving them into the position shown in full lines, this movement raising the levers causing the bars 22 to slide forward and the detents 31 to lock the wheels.

By raising the front end of the plate 44, the hooks 42 can be engaged with the hood and pins and thereafter lowering the plates permits using the lock 48 positively preventing motion until again released.

At the same time the detents are extended to engage between the spokes of the wheel positively locking the vehicle from movement.

In place of entering the detents between the spokes, the angularly projection portions of the detents may be arranged to make forcible contact with the tire of the wheel, acting in the manner of brakes, but holding the wheels from rotations.

From the foregoing it will be seen that a simple device for this purpose has been disclosed in the preferred form of its embodiment, but it is not desired to restrict the details to the exact construction shown, it being obvious that changes, not involving the exercise of invention may be made without conflicting with the scope of the appended claims.

Having thus described my invention, what I claim as new and desire to secure by Letters Patent, is:—

1. In combination with a baby carriage having a body and a hood pivoted thereover, of a pair of rigid plates slidably engaged together and disposable over said body when extended, means on one of said plates engageable with said hood whereby it is securely held, and a lock fixed in said body to engage the other plate.

2. In combination with a baby carriage having a body and a hood pivoted thereover, of a pair of rigid plates arranged side by side and relatively slidable endwise, means at the end of said body for normally supporting said plates when closed, said plates when open extending over said body, means for positively engaging one of said plates to said hood, and means for locking the other plate to the opposite end of said body.

3. In combination with a baby carriage having a frame, a body, a hood pivoted on said body and wheels on which said frame is mounted, of a cover composed of slidable sections disposable over said body, means for securing the end sections to said cover and hood respectively, said means preventing the movement of said hood when in operative position, and means on said frame for supporting said cover when its sections are closed against the front of said body.

4. In combination with a baby carriage having a frame, a body, a hood pivoted on said body and wheels on which said frame is mounted, of a cover disposable over said body, means for securing said cover in operative position, and means on said frame for locking said wheels, said means being actuated by said cover.

5. In combination with a baby carriage having a frame, a body, a hood pivoted on said body and wheels on which said frame is mounted, of a cover disposable over said body, means for securing said cover in operative position, bars mounted to slide longitudinally on said frame adjacent the wheels, detents pivoted on said frame engageable with said wheels, said detents being operated in unison by said sliding bars, and operative connections between said cover and sliding bars.

6. In combination with a baby carriage having a frame, a body, a hood pivoted on said body and wheels supporting said frame, of a rigid cover disposable over said body, means for engaging said cover to said hood, means for locking the cover when extended, and means operatively combined with said cover for automatically locking the wheels when the cover is extended.

7. In combination with a baby carriage having a frame, a body, a hood pivoted on said body and wheels on which said frame is mounted, of a cover disposable over said body, means for securing said cover in operative position, bars mounted to slide longitudinally on said frame adjacent the wheels, detents pivoted on said frame engageable with said wheels, said detents being operated in unison by said sliding bars, levers pivoted on said frame extending operatively through said sliding bars, said levers connecting with said cover on opposite sides at one end thereof, and brace rods engaging between said levers and said cover midway in the length thereof.

In testimony whereof I have signed my name to this application.

MICHAEL KAHNE.